US011223742B2

(12) United States Patent
Tungatkar

(10) Patent No.: US 11,223,742 B2
(45) Date of Patent: Jan. 11, 2022

(54) STORAGE MEDIUM STORING INFORMATION PROCESSING PROGRAM, INFORMATION PROCESSING APPARATUS, AND INFORMATION PROCESSING METHOD

(71) Applicant: BROTHER KOGYO KABUSHIKI KAISHA, Nagoya (JP)

(72) Inventor: Rutuja Tungatkar, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/903,504

(22) Filed: Jun. 17, 2020

(65) Prior Publication Data

US 2021/0067657 A1    Mar. 4, 2021

(30) Foreign Application Priority Data

Aug. 30, 2019  (JP) .............................. JP2019-158262

(51) Int. Cl.
*H04N 1/00*  (2006.01)
*H04N 1/387*  (2006.01)
*H04N 1/203*  (2006.01)

(52) U.S. Cl.
CPC ......... *H04N 1/387* (2013.01); *H04N 1/00411* (2013.01); *H04N 1/00442* (2013.01); *H04N 1/203* (2013.01); *H04N 2201/0094* (2013.01)

(58) Field of Classification Search
USPC .................... 358/1.11–1.18, 473–474, 505
See application file for complete search history.

(56) References Cited

U.S. PATENT DOCUMENTS

2003/0217034 A1*  11/2003  Shutt ................... G06F 21/6218
2005/0094208 A1*  5/2005  Mori ..................... G06F 40/166
                                                              358/1.18
2011/0058231 A1*  3/2011  Oshima .............. H04N 1/00795
                                                              358/474

(Continued)

FOREIGN PATENT DOCUMENTS

JP          2005-143039 A       6/2005
JP          2008-167287 A       7/2008
JP          2015-198288 A       11/2015

*Primary Examiner* — Marcellus J Augustin
(74) *Attorney, Agent, or Firm* — Scully Scott Murphy and Presser

(57)   ABSTRACT

A set of program instructions, when executed by a controller of an information processing apparatus configured to communicate with an image scanner, causes the information processing apparatus to: display, on a display of the information processing apparatus, a scan result screen formed by alternately arranging a front-side image and a back-side image of a document scanned by the image scanner, the front-side image and the back-side image being received from the image scanner; perform at least insertion of an image of a newly-scanned document into a plurality of images displayed on the scan result screen, or deletion of an image included in the plurality of images displayed on the scan result screen; and in response to determining that the insertion or the deletion is performed, disable file separation, the file separation being separating a plurality of images displayed on the scan result screen into files.

18 Claims, 8 Drawing Sheets

(56) References Cited

U.S. PATENT DOCUMENTS

| | | | |
|---|---|---|---|
| 2013/0208999 A1* | 8/2013 | Miyata | H04N 1/3873 |
| | | | 382/309 |
| 2015/0207945 A1* | 7/2015 | Odaira | H04N 1/32096 |
| | | | 358/1.15 |
| 2015/0281478 A1 | 10/2015 | Okamoto | |
| 2019/0306333 A1* | 10/2019 | Watariuchi | H04N 1/00474 |

* cited by examiner

STORAGE MEDIUM STORING INFORMATION PROCESSING PROGRAM, INFORMATION PROCESSING APPARATUS, AND INFORMATION PROCESSING METHOD

CROSS REFERENCE TO RELATED APPLICATIONS

This application claims priority from Japanese Patent Application No. 2019-158262 filed Aug. 30, 2019. The entire content of the priority application is incorporated herein by reference.

TECHNICAL FIELD

This disclosure relates to a storage medium storing an information processing program executable on an information processing apparatus configured to communicate with an image scanner that reads an image of a document, an information processing apparatus, and an information processing method.

BACKGROUND

Upon receiving scan data from a scanner, an information processing apparatus (PC) capable of communicating with the scanner displays a preview screen that displays a list of images based on the received scan data on a panel to display a successive scan icon in the preview screen and insert images based on newly received scan data at a position to which the successive scan icon has been dragged.

SUMMARY

According to one aspect, this specification discloses a non-transitory computer-readable storage medium storing a set of program instructions for an information processing apparatus configured to communicate with an image scanner. The set of program instructions, when executed by a controller of the information processing apparatus, causes the information processing apparatus to: display, on a display of the information processing apparatus, a scan result screen formed by alternately arranging a front-side image and a back-side image of a document scanned by the image scanner, the front-side image and the back-side image being received from the image scanner; perform at least insertion of an image of a newly-scanned document into a plurality of images displayed on the scan result screen, or deletion of an image included in the plurality of images displayed on the scan result screen; and in response to determining that the insertion or the deletion is performed, disable file separation, the file separation being separating a plurality of images displayed on the scan result screen into files.

According to another aspect, this specification also discloses an information processing apparatus. The information processing apparatus includes a communication interface, a display, a controller, and a memory storing a set of instructions. The instructions, when executed by the controller, cause the information processing apparatus to: display, on the display, a scan result screen formed by alternately arranging a front-side image and a back-side image of a document scanned by an image scanner, the front-side image and the back-side image being received from the image scanner through the communication interface; perform at least insertion of an image of a newly-scanned document into a plurality of images displayed on the scan result screen, or deletion of an image included in the plurality of images displayed on the scan result screen; and in response to determining that the insertion or the deletion is performed, disable file separation, the file separation being separating a plurality of images displayed on the scan result screen into files.

According to still another aspect, this specification also discloses an information processing method. The information processing method includes: displaying, on a display of an information processing apparatus, a scan result screen formed by alternately arranging a front-side image and a back-side image of a document scanned by an image scanner, the front-side image and the back-side image being received from the image scanner; performing at least insertion of an image of a newly-scanned document into a plurality of images displayed on the scan result screen, or deletion of an image included in the plurality of images displayed on the scan result screen; and in response to determining that the insertion or the deletion is performed, disabling file separation, the file separation being separating a plurality of images displayed on the scan result screen into files.

BRIEF DESCRIPTION OF THE DRAWINGS

Embodiments in accordance with this disclosure will be described in detail with reference to the following figures wherein.

DETAILED DESCRIPTION

In the above-described technique, however, inserting new scan data into scan data of the separation target before separating scan data into files after both sides of a document are scanned is not taken into consideration. Thus, when scan data is separated into files after new scan data is inserted, consistency of the scan data may not be guaranteed.

In view of the foregoing, an aspect of an object of this disclosure is to provide a technique of preventing inconsistency of scan data which occurs when scan data is separated into files after new scan data is inserted or after scan data is deleted.

An embodiment of this disclosure will be described in detail while referring to the accompanying drawings.

Figure 1:
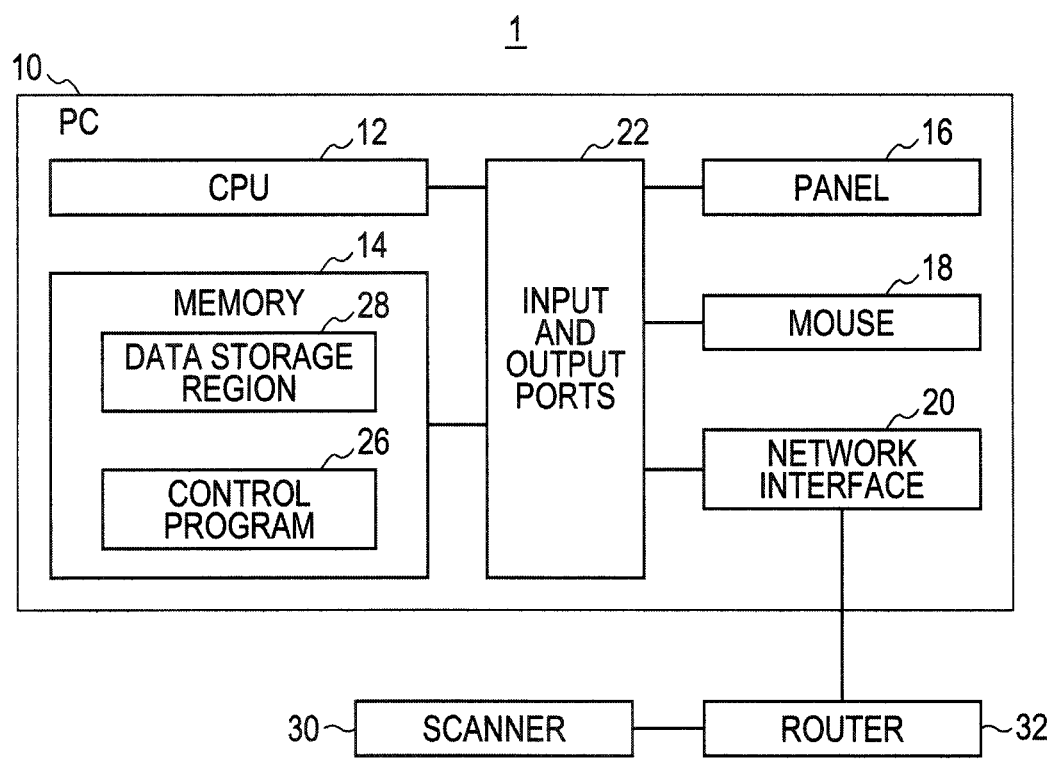
FIG. 1 is a block diagram showing the control configuration of a communication system according to an embodiment of this disclosure.

As shown in FIG. 1, a communication system 1 includes a PC (Personal Computer) 10, a scanner 30, and a router 32. The PC 10 mainly includes a central processing unit (CPU) 12, a memory 14, a panel 16, a mouse 18, and a network interface (I/F) 20. These components 12, 14, 16, 18, and 22 communicate with each other through input and output ports 22.

The network interface 20 communicates with an external device through the router 32, and in the present embodiment, is connected to the scanner 30 through the router 32. Due to this, the PC 10 transmits and receives various pieces of data to and from the scanner 30.

The panel 16 has a display surface and displays images and so on based on image data on the display surface. The mouse 18 moves a cursor displayed on the display surface of the panel 16 and receives a drag operation, a click operation, and so on of a user.

The CPU 12 executes processing according to a control program 26 in the memory 14. The control program 26 is a program for causing the scanner 30 to execute scan processing.

The memory 14 is configured such that a random access memory (RAM), a read only memory (ROM), a flash memory, a hard disk drive (HDD), and a buffer included in the CPU 12 are incorporated therein. The memory 14 includes a data storage region 28. The data storage region 28 is a region in which scan data acquired from the scanner 30 and data and so on necessary for execution of the control program 26 are stored.

In the communication system 1, the scanner 30 executes scan processing according to a scan command from the PC 10, and the scan data generated by the scan processing is transmitted to the PC 10. In this case, when one or more documents are scanned collectively by the scanner 30, scan data of these one or more documents are stored in the PC 10 as a group of scan data (hereinafter sometimes referred to as "scan data group"). In the present embodiment, one document means one sheet of document such as paper.

When a user wants to add new scan data to the scan data group, scan processing is performed again. That is, it is assumed that one or more documents are scanned and scan data of the one or more documents are stored in the PC 10. There is a case where it is desired that scan data of a new document is stored together with the scan data of the document scanned earlier. In this case, new scanning is performed subsequently to previous scanning, and the scan data of a new document and the scan data of a document scanned earlier are stored in association with each other in the data storage region 28.

Figure 2A:
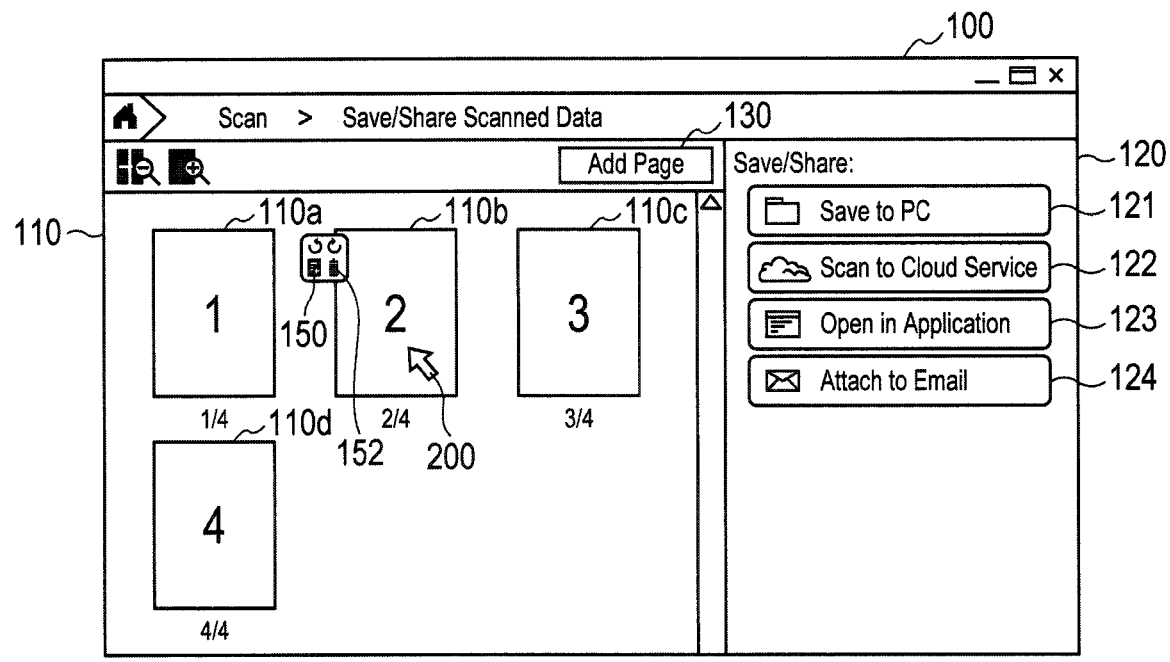
FIGS. 2A and 2B are screen shots showing that new scan data is inserted into previewed scan data group.
Figure 2B:
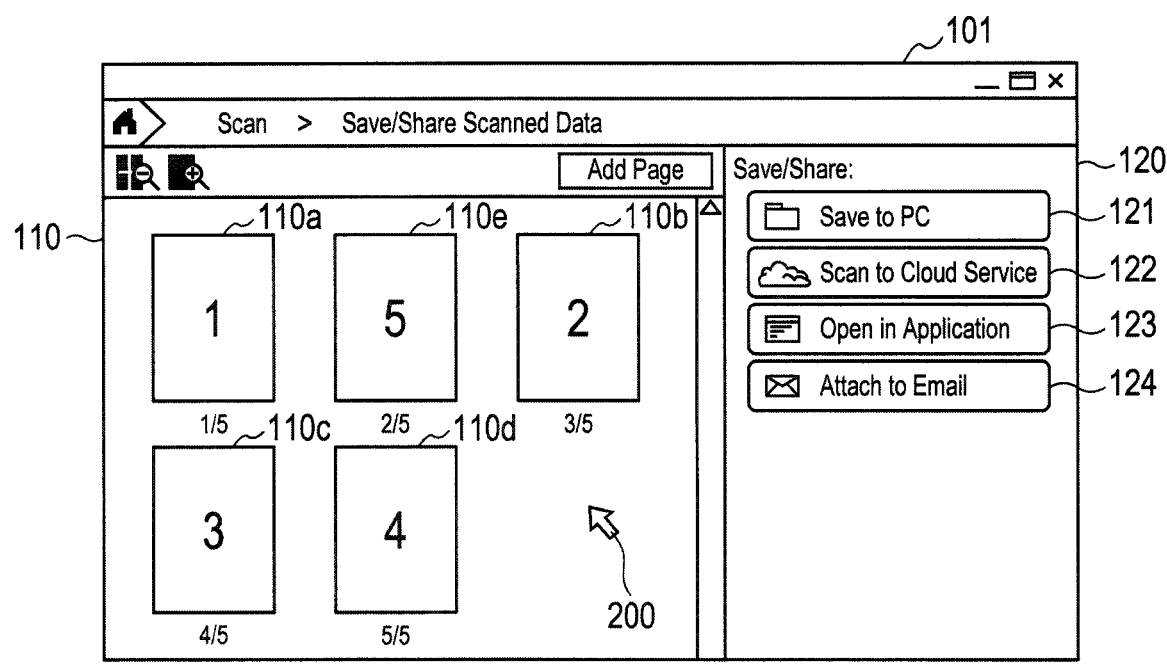

FIGS. 2A and 2B show an example of a scan-data saving screen displayed on the panel 16. A scan-data saving screen 100 shown in FIG. 2A mainly includes a preview display region 110 for displaying a preview of a scan data group and a saving/sharing instruction region 120 for displaying a plurality of buttons for instructing saving/sharing of a scan data group. A scan-data saving screen 101 shown in FIG. 2B as well as scan-data saving screens shown in FIGS. 3A to 6B described later have a main screen arrangement similar to that of the scan-data saving screen 100.

In the example of FIG. 2A, a scan data group includes four scan data. The four scan data are obtained with the scanner 30 by scanning the front and back sides of each of two documents and by storing four scan data in the data storage region 28 of the PC 10. Thus, display frames 110a to 110d for displaying the respective four scan data are formed in the preview display region 110, and images associated with the respective scan data are displayed in the respective display frames 110a to 110d. In this case, it is assumed that the image in the display frame 110a and the image in the display frame 110b correspond to the images of the front and back sides of one document, and the image in the display frame 110c and the image in the display frame 110d correspond to the images of the front and back sides of the other document. A number of display frames corresponding to the number of scan data are formed, and in the present embodiment, no vacant display frame in which no image is displayed is present.

A "Save to PC" button 121, a "Save to Cloud Service" button 122, an "Open in Application" button 123, and an "Attach to Email" button 124 are displayed in the saving/sharing instruction region 120.

The "Save to PC" button 121 is a button for issuing an instruction to save a scan data group (that is, in the example of FIG. 2A, a scan data group made up of respective scan data based on respective images displayed in the display frames 110a to 110d) in the data storage region 28 (for example, a HDD) of the PC 10. The "Save to Cloud Service" button 122 is a button for issuing an instruction to save a scan data group in a server (not illustrated) connected through the network interface 20. The "Open in Application" button 123 is a button for issuing an instruction to start up an application for performing editing such as data conversion on the scan data group and hand over the scan data group to the application. The "Attach to Email" button 124 is a button for issuing an instruction to attach a scan data group to an email and send the email to a destination.

A cursor 200 that moves vertically and horizontally on the display surface of the panel 16 according to an operation of the mouse 18 is displayed on the display surface of the panel 16. FIG. 2A shows a state in which the cursor 200 is located in the display frame 110b. In this manner, in the present embodiment, a state in which a user positions the cursor 200 in the display frame 110b and no other operation is performed on the display frame 110b will be referred to as "mouseover". That is, such a cursor operation of a user is expressed that "the image of the display frame 110b is moused over". The "mouseover" is a general term, and a user may "mouseover" on a display element (specifically, various buttons 121 to 124) other than the display frames 110a to 110d. However, in the present embodiment, since a user positions the cursor 200 over display elements other than the display frames 110a to 110d in order to perform operations (such as click), the expression "mouseover" will not be used for those display elements.

As shown in FIG. 2A, when the image of the display frame 110b is moused over, an icon group is displayed to the left from the center of the display frame 110b. In the present embodiment, the icon group includes an insertion icon 150, a deletion icon 152 (see also FIG. 3A), a clockwise rotation icon, and a counterclockwise rotation icon. Although the insertion icon 150 and the deletion icon 152 are used for control processing in the present embodiment, the clockwise rotation icon and the counterclockwise rotation icon are not used for the control processing. Thus, description of the clockwise rotation icon and the counterclockwise rotation icon will be omitted.

The icon group is preferably located on the left side (left edge) of the display frame 110b, but need not fit within the display frame 110b. However, if the entire icon group is displayed outside the display frame 110b, it would be difficult to understand which of the display frames 110a to 110d the icon group corresponds to. Thus, it is preferable that at least part of the icon group overlaps the display frame 110b.

The insertion icon 150 is an icon for issuing an instruction to provide a new display frame to the left of a display frame (that is, in FIG. 2A, the display frame 110b) in which an icon group is being displayed and to display an image associated with the scan data of a new document in the display frame. When the insertion icon 150 is operated, the PC 10 (the CPU 12) transmits a scan command to the scanner 30 through the network interface 20 and the router 32. In response to this, the scanner 30 scans a new document and transmits the scan data thereof to the PC 10, and the PC 10 receives the scan data, generates a new display frame, and displays an image associated with the received scan data in the display frame.

FIG. 2B shows the scan-data saving screen 101 in a case where the insertion icon 150 is operated on the scan-data saving screen 100 of FIG. 2A. In the scan-data saving screen 101, a new display frame 110e is generated, and an image associated with the scan data of a new document is displayed in the display frame 110e. In the example of FIG. 2B, since only one display frame 110e is generated, the image of the display frame 110e is an image of one side of a single new document. That is, the scan data group in FIG. 2B includes scan data based on two sets of images of a pair of front and back sides and scan data based on an image of a single side.

Figure 3A:
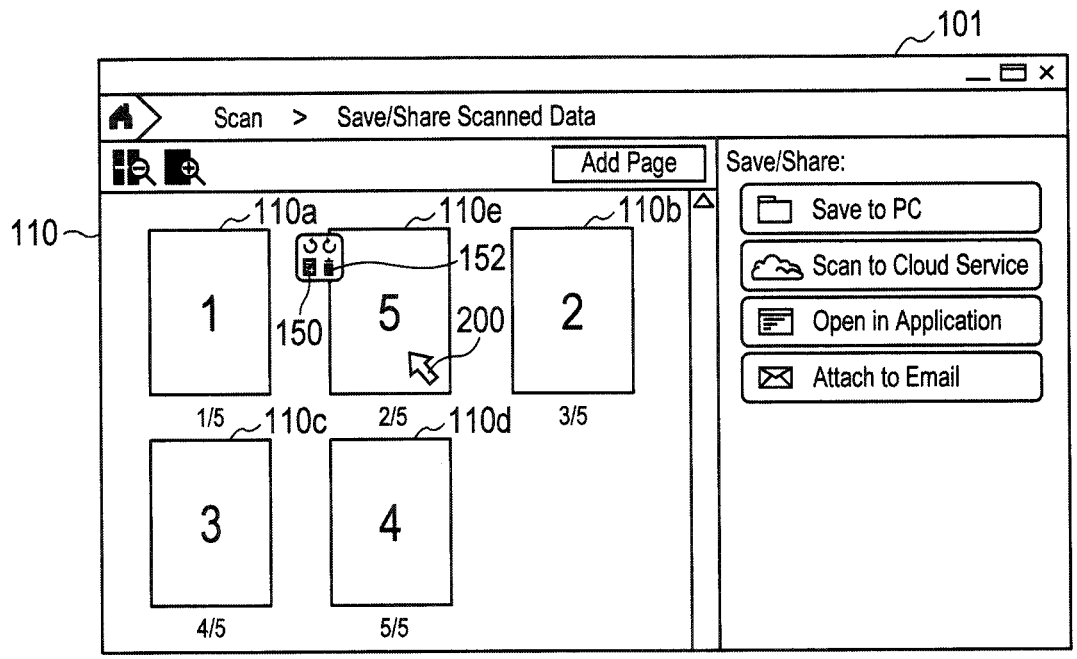
FIGS. 3A and 3B are screen shots showing that scan data is deleted from previewed scan data group.

The deletion icon 152 is an icon for issuing an instruction to delete a display frame (that is, the display frame 110b in FIG. 2A, and the display frame 110e in FIG. 3A) on which an icon group is being displayed. When the deletion icon 152 is operated in FIG. 2A, the CPU 12 deletes the display frame 110b and deletes the scan data based on the image displayed in the display frame 110b from the scan data group. The scan-data saving screen 101 in FIG. 3A is the same screen as the scan-data saving screen 101 in FIG. 2B. However, the position of the cursor 200 is different between FIG. 3A and FIG. 2B.

Figure 3B:
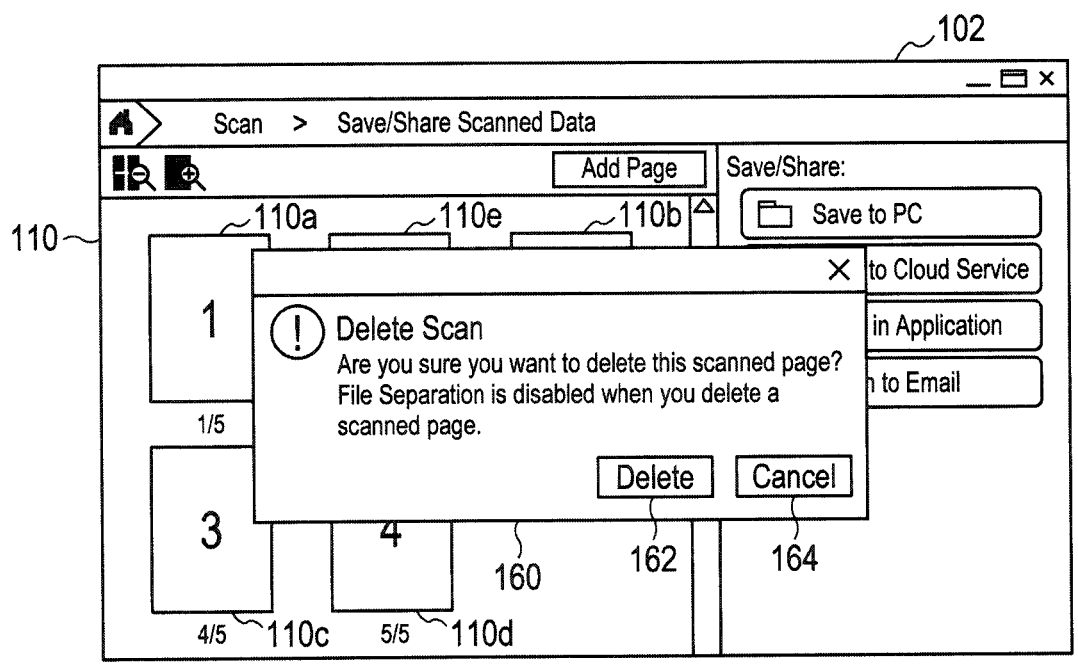

FIG. 3B shows a scan-data saving screen 102 when the deletion icon 152 is operated on the scan-data saving screen 101 in FIG. 3A. An alert window 160 that calls attention as to whether to delete scan data is displayed in the scan-data saving screen 102 as a popup. In this manner, deletion of a display frame is not executed by a single operation of the deletion icon 152, but the alert window 160 is displayed before deletion to allow a user to make final confirmation. This is because document-by-document file separation setting to be described later is disabled for a scan data group after a display frame is deleted. Thus, the alert window 160 displays a message warning that file separation is disabled if scan data is deleted. A user selects whether a display frame (that is, in FIG. 3B, the display frame 110e) is to be deleted or deletion is to be canceled by pressing a delete button 162 or a cancel button 164 in the alert window 160.

Figure 4A:
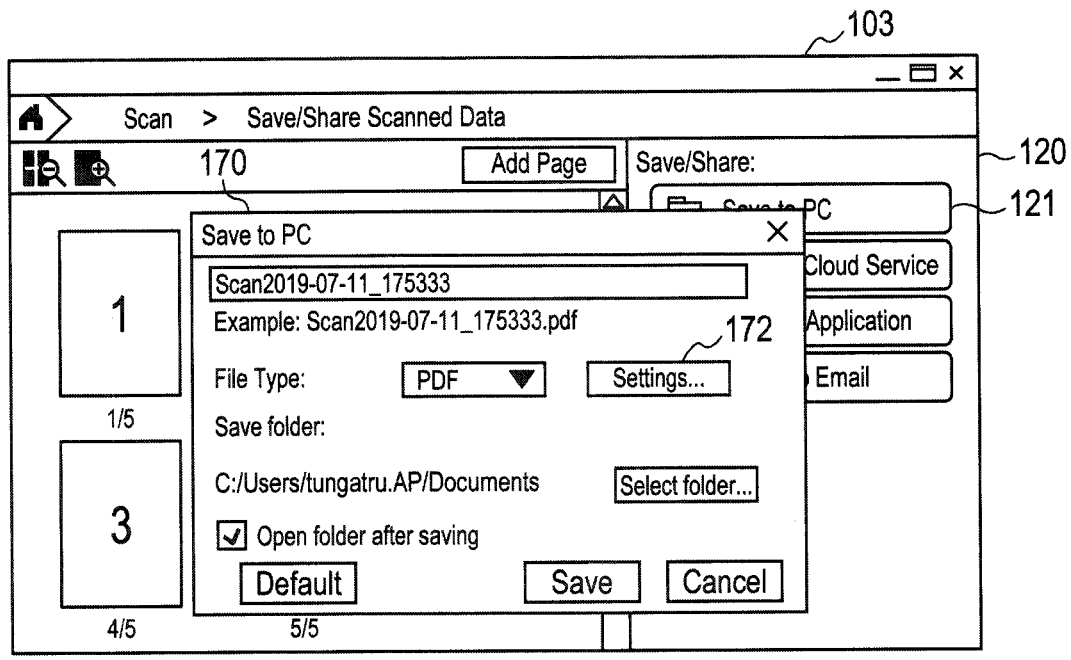
FIGS. 4A and 4B are screen shots showing that file separation is instructed for previewed scan data group.
Figure 4B:
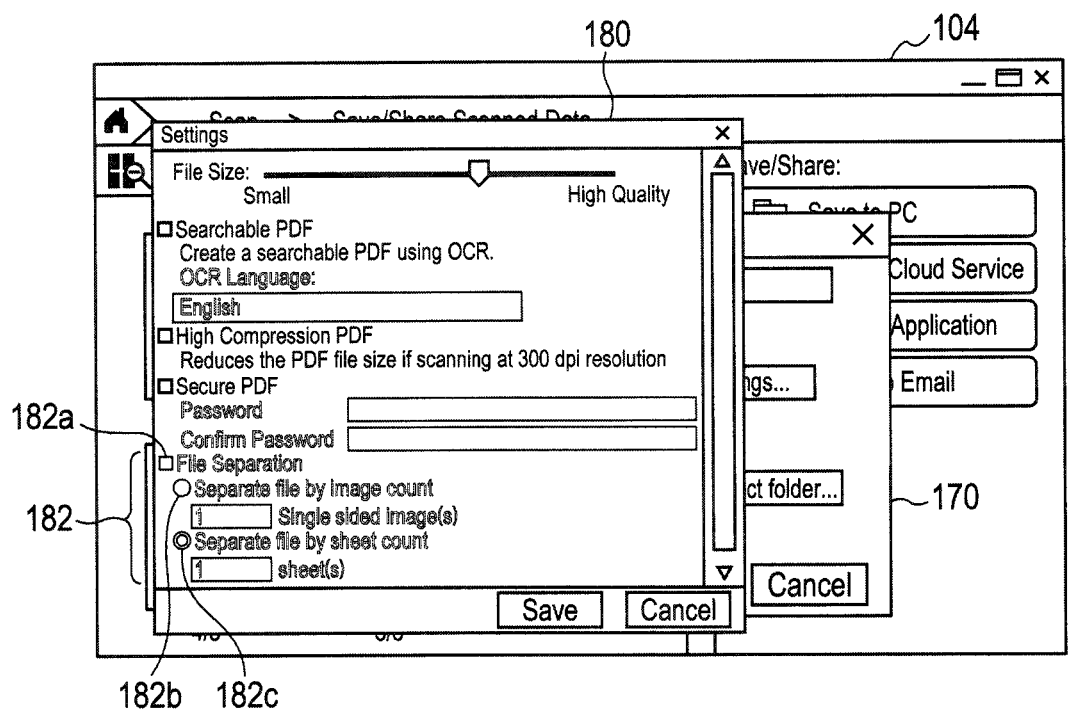

FIG. 4A shows a scan-data saving screen 103 when the "Save to PC" button 121 is pressed in the scan-data saving screen 101 in FIG. 2B. An execution window 170 for issuing an instruction to execute "Save to PC" is displayed in the scan-data saving screen 103 as a popup. In the execution window 170, a user can select a file name and a file type when saving scan data in a PC. In this example, a portable document format (PDF) is selected as a file type. As shown in FIG. 4B, when a settings button 172 in the execution window 170 is pressed, a settings window 180 is displayed as a popup. A screen in which a user selects a file name and a file type like the execution window 170 is also displayed when a user presses any one of the "Save to Cloud Service" button 122, the "Open in Application" button 123, and the "Attach to Email" button 124.

FIG. 4B shows a scan-data saving screen 104 when the settings button 172 is pressed. The settings window 180 is further displayed from the scan-data saving screen 103 in FIG. 4A in the scan-data saving screen 104 as a popup.

Although various settings for PDF are made in the settings window 180, a last check box 182a is displayed in grayscale so that it is not selectable. The check box 182a is a check box for setting whether to enable any one of a radio button 182b for instructing image-by-image file separation and a radio button 182c for instructing document-by-document file separation (hereinafter, whether to enable the instruction of the radio button 182b or the radio button 182c will be referred to as "file separation setting"). The unit of file separation is not limited to document-by-document file separation based on the instruction of the radio button 182c, and image-by-image file separation based on the instruction of the radio button 182b is also allowed. However, in the present embodiment, document-by-document file separation will be described. Regarding the unit of file separation, the document-by-document file separation is file separation into a plurality of files each corresponding to one document (one sheet of paper). Thus, each of separated files may include two images of the front and back sides of a document. When performing the document-by-document file separation, the images included in a scan data group are separated into pairs of images sequentially by starting from the first image, such as a pair of the first image and the second image, a pair of the third image and the fourth image, and so on (in the example of FIG. 2A, a pair of images in the display frames 110a and 110b, a pair of images in the display frames 110c and 110d, and so on). In contrast, the image-by-image file separation is file separation into a plurality of files each corresponding to one image. Thus, each of separated files includes an image of one side of a document.

In a screen (that is, the scan-data saving screen 101 in FIG. 2B) before transition to the scan-data saving screen 103, a new display frame 110e is generated and inserted to the four display frames 110a to 110d as described above. In this case, as described above, a scan data group includes the scan data based on two pairs of images of front and back sides (110a, 110b, 110c, 110d) and the scan data based on an image of a single side (110e). When file separation is performed for such a scan data group, it may be difficult to generate a document-by-document file in which a pair of front and back sides forms one file. That is, by inserting scan data based on an image of a single side or by inserting new scan data into a scan data group, the scan data is inserted between the pair of images of the front and back sides, which may cause inconsistency in the relationship of a pair of front and back sides. Here, the inconsistency refers to a state where a single-sided image (the display frame 110e in FIG. 2B) is present in a scan data group that mainly includes pairs of images of front and back sides. Thus, when new scan data is inserted to a scan data group, the check box 182a is displayed in grayscale so that it is not selectable.

As described above with reference to FIGS. 3A and 3B, when scan data is deleted from a scan data group, file separation setting is disabled and the check box 182a is displayed in grayscale so that it is not selectable. In this case, an event of inserting scan data between the pair of images of the front and back sides does not occur unlike insertion of scan data. The reason why file separation setting is disabled (prohibited) is that separation processing may become complex if file separation is performed on a scan data group after deletion of scan data, and so on.

On the other hand, when data consistency is maintained between scan data included in a scan data group (for example, when a scan data group includes only scan data of a pair of front and back sides), file separation is allowed for this scan data group, and the check box 182a is displayed in a normal manner, not in grayscale, and is selectable.

Figure 5:
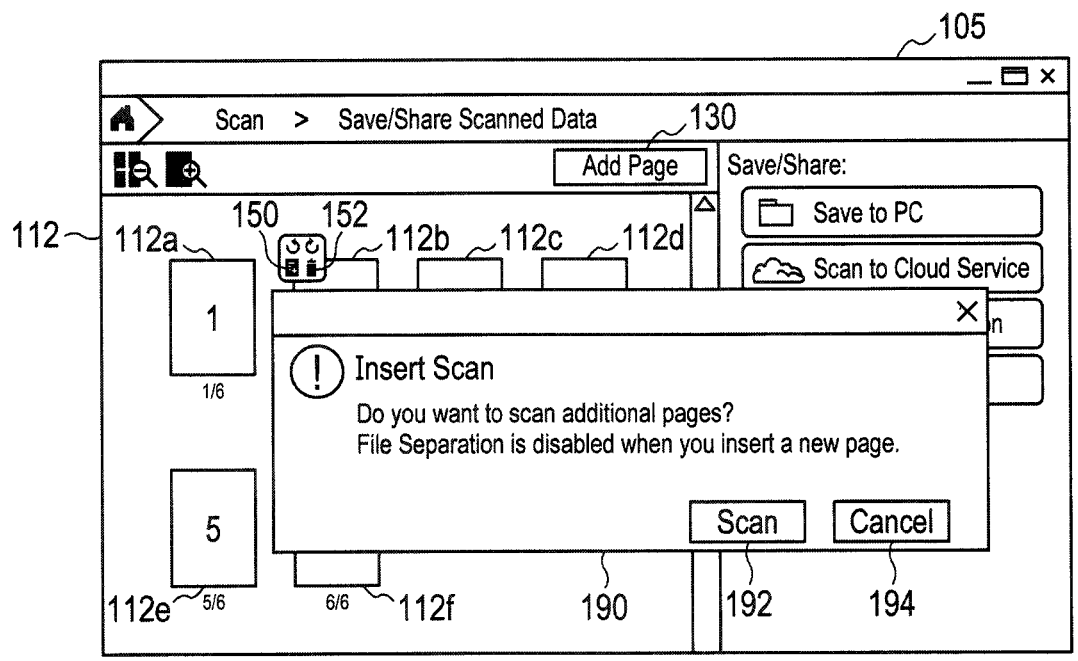
FIG. 5 shows an example of a display screen when an instruction for inserting new scan data into previewed scan data group is given.

FIG. 5 shows a scan-data saving screen 105 when the insertion icon 150 is operated similarly to FIG. 2A. In the example of FIG. 5, a scan data group includes three sets of scan data of a pair of front and back sides. Six display frames 112a to 112f are formed in the preview display region 112, a pair of images are displayed in the display frames 112a and 112b, another pair of images are displayed in the display frames 112c and 112d, and still another pair of images are displayed in the display frames 112e and 112f. In this state, when the image of the display frame 112b is moused over and the insertion icon 150 is operated, an alert window 190 is displayed as a popup.

The alert window 190 calls user's attention as to whether to insert scan data associated with a new document into a scan data group, which is similar to the alert window 160 in FIG. 3B. In a state where scan data in a scan data group have consistency in generating document-by-document files (that is, the scan data group only includes pairs of images for front and back sides of documents), if new scan data is inserted in the scan data group, the above-described inconsistency may occur. Thus, the alert window 190 displays a message warning that file separation is disabled if new scan data is inserted. A user selects whether to insert a new display frame or to cancel insertion by pressing a scan button 192 or a cancel button 194 in the alert window 190.

The alert window 190 is also displayed before the screen 100 of FIG. 2A transitions to the screen 101 of FIG. 2B. However, since FIGS. 2A and 2B are provided to describe how a new display frame is generated according to an operation of the insertion icon 150, a screen in which the alert window 190 is displayed is omitted.

An add page button 130 is a button for issuing an instruction to provide a new display frame after the display frame displayed at the end (the display frame 112f in FIG. 5) and to display an image associated with scan data of a new document in the display frame. Thus, the add page button 130 is different from the insertion icon 150. When the add page button 130 is pressed, new scan data is added to the end of the scan data included in a scan data group. In the present embodiment, file separation is not disabled in this case. This is because the control of file separation is easier (as described above, the images in a scan data group are separated into pairs of images sequentially by starting from the first image) as compared to a case where new scan data is inserted between scan data included in the scan data group and a case where scan data is deleted from the scan data group. Thus, when the add page button 130 is pressed, an alert window like the alert window 190 is not displayed.

Figure 6A:
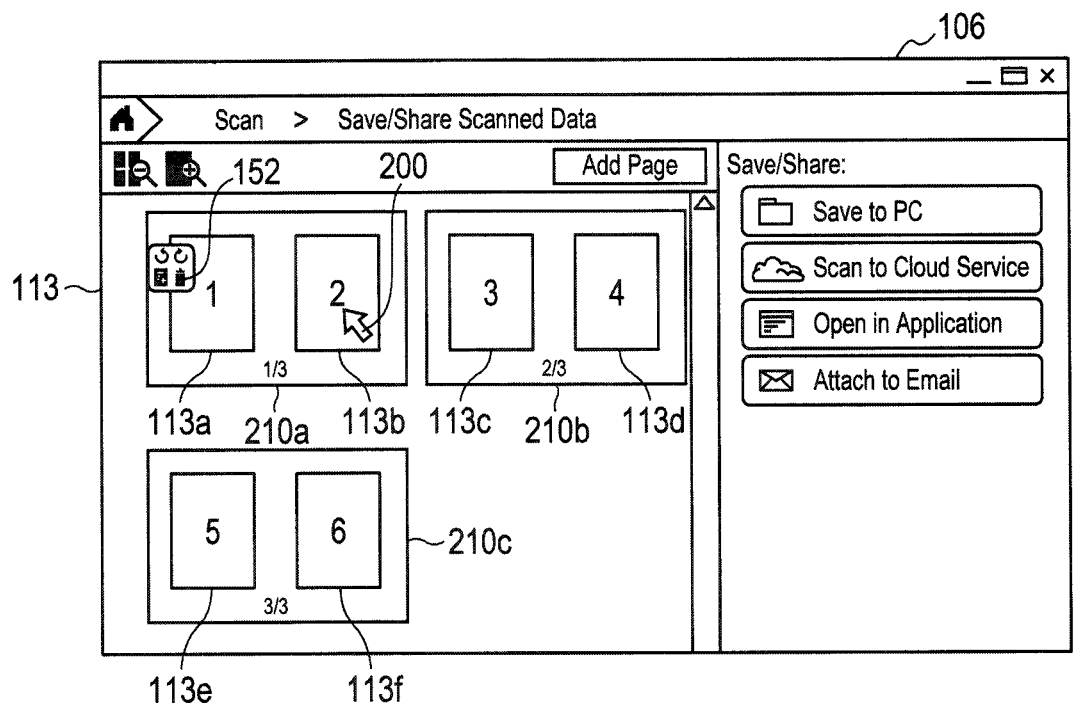
FIGS. 6A and 6B are screen shots showing examples of display patterns of images of a pair of front and back sides.
Figure 6B:
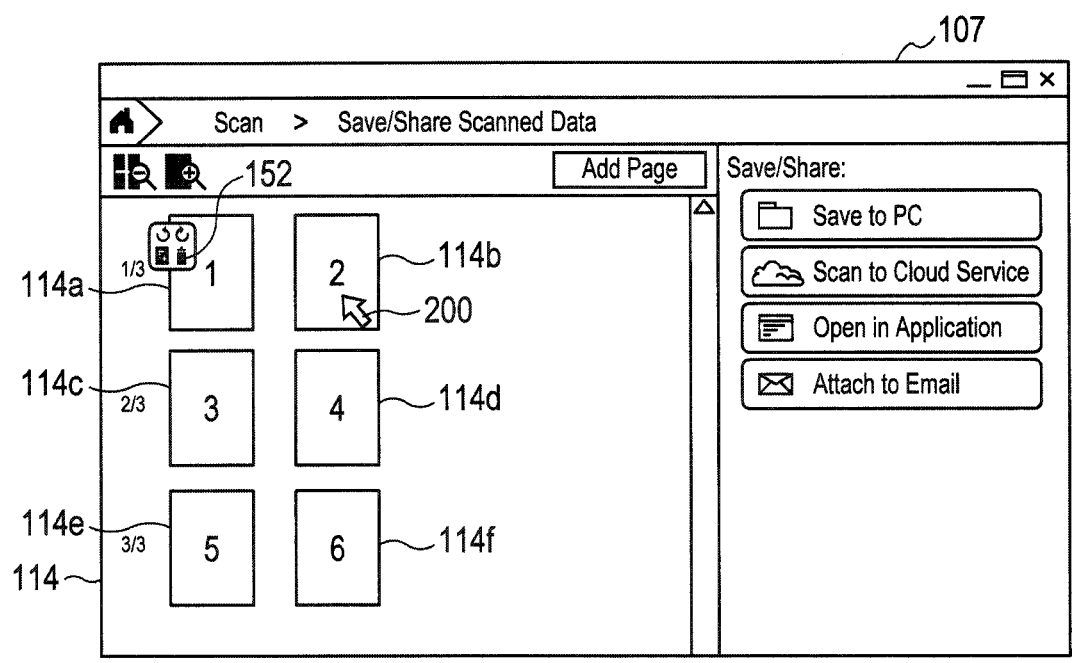

FIGS. 6A and 6B show examples of display so that it is easily understandable that scan data is for a pair of front and back sides.

In a scan-data saving screen 106 of FIG. 6A, six display frames 113a to 113f are displayed in a preview display region 113. The images of the display frames 113a and 113b, the images of the display frames 113c and 113d, and the images of the display frames 113e and 113f are the images of a pair of front and back sides. Thus, the display frames 113a and 113b are surrounded by a frame 210a, the display frames 113c and 113d are surrounded by a frame 210b, and the display frames 113e and 113f are surrounded by a frame 210c so as to be understandable that the images in each frame are the images of a pair of front and back sides. The frames 210a to 210c are preferably displayed in a color (for example, red) that stands out.

In a scan-data saving screen 107 of FIG. 6B, six display frames 114a to 114f are displayed in a preview display region 114. In the example of FIG. 6B, two display frames of a pair of front and back sides are displayed so that two frames are arranged adjacent to each other horizontally. Numbers (specifically, 1/3, 2/3, and 3/3) are serially assigned to respective documents (that is, the images of pairs of front and back sides). This number assignment is also applied to the example of FIG. 6A.

A display mode of FIG. 6A and a display mode of FIG. 6B may be set to be freely selectable by a user, and any one display mode may be set fixedly. The display mode of FIG. 6A and the display mode of FIG. 6B may be combined. In this case, two adjacent display frames are surrounded by a frame.

When the images of a pair of front and back sides are moused over, an icon group is displayed in the display frame of the front-side image. In the example of FIG. 6A, when the image of the display frame 113b is moused over, the icon group is displayed in the display frame 113a. When the deletion icon 152 is operated, the display frame 113b as well as the display frame 113a is also deleted. This is because, as will be described later, even after scan data of a pair of front and back sides is deleted from a scan data group, the consistency is maintained in the scan data group in generating document-by-document files. In other words, document-by-document file separation can be performed easily. Similarly, in the example of FIG. 6B, when the image of the display frame 114b is moused over, the icon group is displayed in the display frame 114a.

In the following descriptions for double-sided scan determination processing in FIG. 8, "step" is abbreviated as "S".

Figure 8:
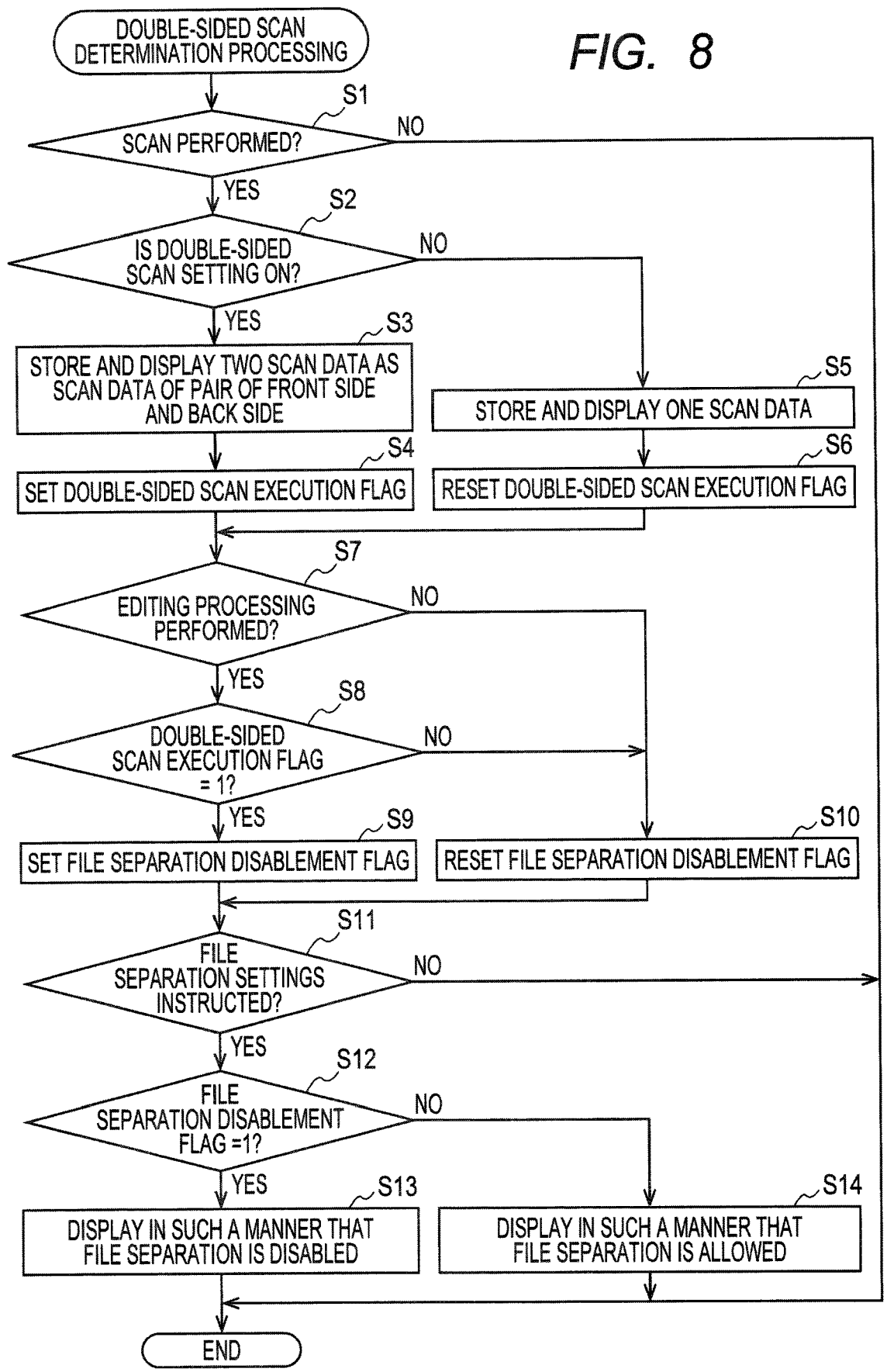
FIG. 8 is a flowchart showing steps of double-sided scan determination processing executed by a PC in FIG. 1, specifically, by a CPU.

In FIG. 8, first, the CPU 12 determines whether scanning has been executed (S1). This determination is made based on whether the CPU 12 has received scan data from the scanner 30.

In response to determining in S1 that scanning is not executed (S1: NO), the CPU 12 ends the double-sided scan determination processing.

In response to determining in S1 that scanning is performed (S1: YES), the CPU 12 determines whether double-sided scan setting is ON (S2). Since double-sided scan setting is performed on the PC 10, the setting is stored in the data storage region 28. Thus, the determination of S2 is performed based on the double-sided scan setting stored in the data storage region 28.

In response to determining in S2 that the double-sided scan setting is ON (S2: YES), the CPU 12 stores two scan data as the scan data of a pair of front and back sides and displays the scan data (S3). With this display processing, as described above based on FIGS. 6A and 6B, the user can easily understand a pair of front and back sides. Subsequently, the CPU 12 sets a double-sided scan execution flag (flag=1) (S4) and processing proceeds to S7.

In response to determining in S2 that the double-sided scan setting is OFF (S2: NO), the CPU 12 stores one scan data and displays the scan data (S5). Subsequently, the CPU 12 resets the double-sided scan execution flag (flag=0) (S6) and processing proceeds to S7.

In S7, the CPU 12 determines whether editing processing has been performed. The "editing processing" in this embodiment corresponds to insertion of scan data to a scan data group according to an operation of the insertion icon 150 or deletion of scan data from a scan data group according to an operation of the deletion icon 152. In contrast, addition of scan data to a scan data group according to pressing of the add page button 130 does not correspond to the editing processing.

In response to determining in S7 that the editing processing has not been performed (S7: NO), the CPU 12 proceeds to S10 described later.

In response to determining in S7 that the editing processing has been performed (S7: YES), the CPU 12 determines whether the double-sided scan execution flag is one (S8). In response to determining that the double-sided scan execution flag is one (S8: YES), the CPU 12 sets a file separation disablement flag (flag=1) (S9) and processing proceeds to S11.

In response to determining in S8 that the double-sided scan execution flag is zero (S8: NO), the CPU 12 resets the file separation disablement flag (flag=0) (S10) and processing proceeds to S11.

In S11, the CPU 12 determines whether a file separation setting is instructed. In response to determining that file separation setting is not instructed (S11: NO), the CPU 12 ends the double-sided scan determination processing. In this case, the phrase "file separation setting is instructed" means that it is instructed to display the file separation setting screen (the settings window 180) shown in FIG. 4B.

In response to determining in S11 that file separation setting is instructed (S11: YES), the CPU 12 determines whether the file separation disablement flag is one (S12). In response to determining that the file separation disablement flag is one (S12: YES), the CPU 12 displays that file separation is disabled (S13) and ends the double-sided scan determination processing. In this case, "displaying of disabled file separation" is the grayscale display of the check box 182*a* as shown in FIG. 4B, for example.

In response to determining in S12 that the file separation disablement flag is zero (S12: NO), the CPU 12 displays that file separation is enabled (S14) and ends the double-sided scan determination processing. In this case, "displaying of enabled file separation" is displaying the check box 182*a* so as to be selectable, not the grayscale display.

As described above, in the double-sided scan determination processing, if the editing processing is performed when the double-sided scan setting is ON and double-sided scan of a document is performed, the file separation disablement flag is set and thus the file separation setting cannot be set to ON.

However, depending on the content of the editing processing, there is a case where the file separation setting may be set to ON.

Figure 7A:
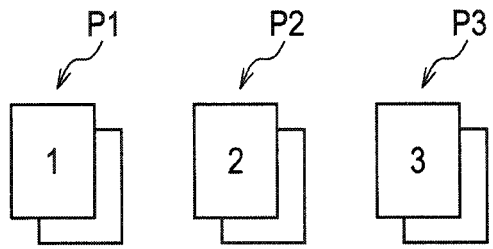
FIGS. 7A to 7D are explanatory diagrams for illustrating cases in which file separation setting is not disabled.
Figure 7B:
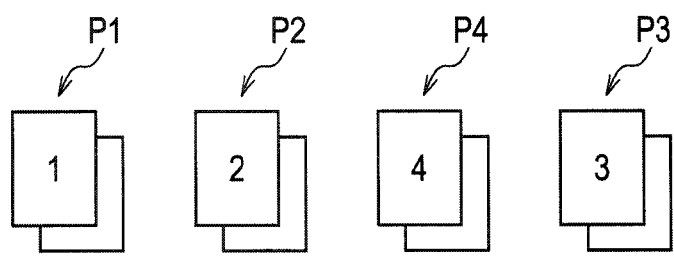
Figure 7C:
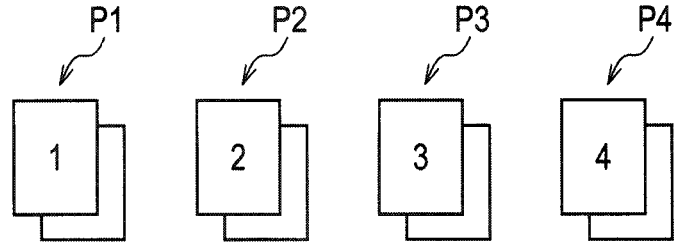

FIGS. 7A to 7D are provided to describe such a case. FIGS. 7A and 7C show scan data included in a scan data group before editing processing is performed. That is, the scan data group of FIG. 7A includes three sets of scan data P1 to P3 of pairs of front and back sides (that is, six scan data). The scan data group of FIG. 7C includes four sets of scan data P1 to P4 of pairs of front and back sides (that is, eight scan data).

FIG. 7B shows a case in which a set of scan data P4 of a pair of front and back sides is inserted between one set of scan data P2 and one set of scan data P3 of the scan data group of FIG. 7A. In this case, since one set of scan data P4 is the scan data of a pair of front and back sides, even if it is inserted in the scan data group of FIG. 7A, the consistency is maintained in the scan data group after insertion in creating document-by-document files. That is, file separation is enabled. Thus, in this case, it is determined in S7 that the editing processing is not performed and the CPU 12 proceeds from S7 to S10 and resets the file separation disablement flag.

Figure 7D:
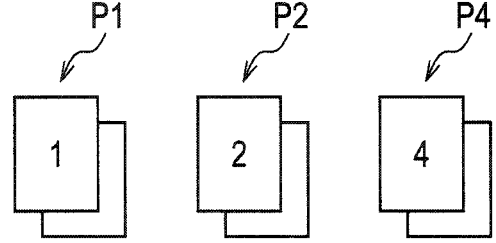

FIG. 7D shows a case in which one set of scan data P3 is deleted from the scan data group of FIG. 7C. In this case, since one set of scan data P3 is for a pair of front and back sides, the consistency is maintained in the scan data group after deletion in creating document-by-document files. That is, file separation is enabled. Thus, in this case, it is determined in S7 that the editing processing is not performed and the CPU 12 proceeds from S7 to S10 and resets the file separation disablement flag.

As shown in FIG. 7D, even when the deleted set of scan data P3 is restored to return to the state of FIG. 7C, the consistency is maintained in the scan data group after restoring in creating document-by-document files. Further, as shown in FIG. 7D, even when one set of scan data P3 is deleted and a different set of scan data other than the scan data P3 is inserted, the consistency is maintained in the scan data group after insertion in creating document-by-document files. Thus, in either case, it is determined in S7 that the editing processing is not performed and the CPU 12 proceeds from S7 to S10 and resets the file separation disablement flag.

As described above, the control program 26 of the present embodiment causes the PC 10 that performs communication with the scanner 30 configured to read each image of a first side and a second side of a document to execute: display processing of, based on an image of a document read by the scanner 30 and received from the scanner 30, displaying, on the panel 16 of the PC 10, the preview display region 110 formed by alternately arranging a front side (first side) image of the document and a back side (second side) image of the document; creation processing of individually creating files obtained by separating a plurality of images displayed on the preview display region 110 by the display processing on a document-by-document basis (that is, separating the plurality of images into pairs of images, each pair of images corresponding to images of the front and back sides of a document); editing processing of executing at least insertion processing of inserting an image of a document that is newly read by the scanner 30 as the same group as images displayed on the preview display region 110 by the display processing, or deletion processing of deleting a part of the images displayed on the preview display region 110 by the display processing; and disablement processing of, in a case where the editing processing is executed, disabling execution of the creation processing.

Thus, the control program 26 of the present embodiment avoids the inconsistency of scan data that may occur by performing file separation of scan data after insertion of new scan data or after deletion of a part of scan data.

In the present embodiment, the control program 26 is one example of "information processing program". The scanner 30 is one example of "image scanner (image reading apparatus)". The PC 10 is one example of "information processing apparatus". The preview display region 110 is one example of "scan result screen". The panel 16 is one example of "display".

In a case where insertion or deletion of images on a document-by-document basis is performed by the editing processing, execution of the creation processing is not disabled by the disablement processing.

In this way, in the case of insertion or deletion of images on a document-by-document basis, the consistency is maintained when creating such files that scan data is separated on a document-by-document basis. Thus, it is preferable to exclude that case from the prohibition target.

The control program 26 of the present embodiment causes the PC 10 to further execute object display processing of displaying the deletion icon 152 for instructing deletion of scan data on a document-by-document basis within the preview display region 110. In response to an operation of the deletion icon 152, the image displayed on the preview display region 110 is deleted on a document-by-document basis by the editing processing.

This enables an easy operation for maintaining the consistency of scan data of double-sided documents.

The deletion icon 152 is one example of "object".

In a case where an image for which insertion or deletion is performed by the editing processing is returned to the state before the insertion or deletion, execution of the creation processing is not disabled by the disablement processing.

In such editing processing, the consistency of scan data is maintained. Thus, it is preferable to exclude that case from the prohibition target.

Further, files separated on an image-by-image basis may be created by the creation processing. In this case, even when the editing processing is executed, creation of files separated on an image-by-image basis by the creation processing is not disabled by the disablement processing. That is, even in a case where an image is inserted into a scan data group or an image is deleted from a scan data group, image-by-image file separation may be allowed while document-by-document file separation is disabled. In this case, in FIG. 4, the radio button 182b for instructing image-by-image file separation is displayed so as to be selectable, whereas the radio button 182c for instructing document-by-document file separation is displayed so as to be unselectable.

Thus, in the case of file separation on an image-by-image basis, the inconsistency of a pair of the first side and the second side does not occur. Thus, it is preferable to exclude that case from the prohibition target.

The control program 26 of the present embodiment causes the PC 10 to further execute notification processing of, when the editing processing is executed, notifying that execution of the creation processing is disabled by the disablement processing.

This enables the user to preliminarily determine whether to perform editing.

The alert windows 160 and 190 are examples of "notification".

In a case where images displayed on the preview display region 110 are a pair image of the first side and the second side of a document, the pair image surrounded by one frame is displayed by the display processing.

This enables the user to understand which one is the pair image at a glance.

In a case where images displayed on the preview display region 110 are a pair image of the first side and the second side of a document, the pair image is displayed by the display processing in a state where a number is attached to each pair image including two images of the document.

This enables the user to understand which one is the pair image at a glance.

While the disclosure has been described in detail with reference to the above aspects thereof, it would be apparent to those skilled in the art that various changes and modifications may be made therein without departing from the scope of the claims.

(1) For example, in the above-described embodiment, the scanner 30 is connected to the PC 10 through the network interface 20 and the router 32 through the communication network. Alternatively, the scanner 30 may be connected directly to the PC 10 through a USB (Universal Serial Bus), for example, not through the communication network.

(2) In the above-described embodiment, the scanner 30 has mainly only a scan function. Alternatively, a multifunction peripheral (MFP) having a scan function may be adopted.

(3) In the above-described embodiment, only one scanner 30 is connected to the PC 10. Alternatively, a plurality of scanners may be connected to the PC 10, and the information processing program may be configured such that one of the plurality of scanners can be selected. In this case, in addition to the scanners, MFPs may be connected as the target to be selected.

What is claimed is:

1. A non-transitory computer-readable storage medium storing a set of program instructions for an information processing apparatus configured to communicate with an image scanner, the set of program instructions, when executed by a controller of the information processing apparatus, causing the information processing apparatus to:
    display, on a display of the information processing apparatus, a scan result screen formed by alternately arranging a front-side image and a back-side image of a document scanned by the image scanner, the front-side image and the back-side image being received from the image scanner;
    perform at least insertion of an image of a newly-scanned document into a plurality of images displayed on the scan result screen, or deletion of an image included in the plurality of images displayed on the scan result screen; and
    in response to determining that the insertion or the deletion is performed, disable file separation, the file separation being document-by-document file separation of separating a plurality of images displayed on the scan result screen into files, each file being a document-by-document file in which a pair of a front-side image and a back-side image of a document forms one file.

2. The non-transitory computer-readable storage medium according to claim 1, wherein the set of program instructions, when executed by the controller, causes the information processing apparatus to:
    in response to determining that the inserted or deleted image is returned to a state before the insertion or the deletion, allow the file separation.

3. The non-transitory computer-readable storage medium according to claim 1, wherein the file separation further includes:
    image-by-image file separation of separating the plurality of images displayed on the scan result screen into files, each file including one image of a document; and
    wherein the set of program instructions, when executed by the controller, causes the information processing apparatus to:
        in response to determining that the insertion or the deletion is performed, allow the image-by-image file separation and disable the document-by-document file separation.

4. The non-transitory computer-readable storage medium according to claim 1, wherein the set of program instructions, when executed by the controller, causes the information processing apparatus to:
    in response to determining that the insertion or the deletion is performed, output a notification that the file separation is disabled.

5. The non-transitory computer-readable storage medium according to claim 1, wherein the set of program instructions, when executed by the controller, causes the information processing apparatus to:
    in response to determining that images displayed on the scan result screen are a pair image including a front-side image and a back-side image of a document, display the pair image surrounded by one frame.

6. The non-transitory computer-readable storage medium according to claim 1, wherein the set of program instructions, when executed by the controller, causes the information processing apparatus to:

in response to determining that images displayed on the scan result screen are one or more pair images each including a front-side image and a back-side image of a document, display the one or more pair images together with numbers, the numbers being serially assigned to the one or more pair images.

7. The non-transitory computer-readable storage medium according to claim 1, wherein the file separation further includes:

image-by-image file separation of separating the plurality of images displayed on the scan result screen into files, each file including one image of a document; and wherein the set of program instructions, when executed by the controller, causes the information processing apparatus to:

perform the document-by-document file separation by sequentially separating the plurality of images displayed on the scan result screen into pairs of images by starting from a first one of the plurality of images.

8. An information processing apparatus comprising:
a communication interface;
a display;
a controller; and
a memory storing a set of instructions, the instructions, when executed by the controller, causing the information processing apparatus to:

display, on the display, a scan result screen formed by alternately arranging a front-side image and a back-side image of a document scanned by an image scanner, the front-side image and the back-side image being received from the image scanner through the communication interface;

perform at least insertion of an image of a newly-scanned document into a plurality of images displayed on the scan result screen, or deletion of an image included in the plurality of images displayed on the scan result screen; and in response to determining that the insertion or the deletion is performed, disable file separation, the file separation being document-by-document file separation of separating a plurality of images displayed on the scan result screen into files, each file being a document-by-document file in which a pair of a front-side image and a back-side image of a document forms one file.

9. The information processing apparatus according to claim 8, wherein the set of program instructions, when executed by the controller, causes the information processing apparatus to:

in response to determining that the inserted or deleted image is returned to a state before the insertion or the deletion, allow the file separation.

10. The information processing apparatus according to claim 8, wherein the file separation further includes:

image-by-image file separation of separating the plurality of images displayed on the scan result screen into files, each file including one image of a document; and wherein the set of program instructions, when executed by the controller, causes the information processing apparatus to:

in response to determining that the insertion or the deletion is performed, allow the image-by-image file separation and disable the document-by-document file separation.

11. The information processing apparatus according to claim 8, wherein the set of program instructions, when executed by the controller, causes the information processing apparatus to:

in response to determining that the insertion or the deletion is performed, output a notification that the file separation is disabled.

12. The information processing apparatus according to claim 8, wherein the set of program instructions, when executed by the controller, causes the information processing apparatus to:

in response to determining that images displayed on the scan result screen are a pair image including a front-side image and a back-side image of a document, display the pair image surrounded by one frame.

13. The information processing apparatus according to claim 8, wherein the set of program instructions, when executed by the controller, causes the information processing apparatus to:

in response to determining that images displayed on the scan result screen are one or more pair images each including a front-side image and a back-side image of a document, display the one or more pair images together with numbers, the numbers being serially assigned to the one or more pair images.

14. An information processing method comprising:

displaying, on a display of an information processing apparatus, a scan result screen formed by alternately arranging a front-side image and a back-side image of a document scanned by an image scanner, the front-side image and the back-side image being received from the image scanner;

performing at least insertion of an image of a newly-scanned document into a plurality of images displayed on the scan result screen, or deletion of an image included in the plurality of images displayed on the scan result screen; and in response to determining that the insertion or the deletion is performed, disabling file separation, the file separation being document-by-document file separation of separating a plurality of images displayed on the scan result screen into files, each file being a document-by-document file in which a pair of a front-side image and a back-side image of a document forms one file.

15. A non-transitory computer-readable storage medium storing a set of program instructions for an information processing apparatus configured to communicate with an image scanner, the set of program instructions, when executed by a controller of the information processing apparatus, causing the information processing apparatus to:

display, on a display of the information processing apparatus, a scan result screen formed by alternately arranging a front-side image and a back-side image of a document scanned by the image scanner, the front-side image and the back-side image being received from the image scanner;

perform an insertion of a single image of a newly-scanned document into a plurality of images displayed on the scan result screen, or deletion of a single image included in the plurality of images displayed on the scan result screen;

in response to determining that the insertion of a single image or the deletion of a single image is performed, disable document-by-document file separation, the document-by-document file separation separating the plurality of images displayed on the scan result screen into files, each file being a document-by-document file in which a pair of a front-side image and a back-side image of a document forms one file;

perform an insertion of a pair of a front-side image and a back-side image of one or more documents into the plurality of images displayed on the scan result screen, or deletion of a pair of a front-side image and a back-side image of one or more documents included in the plurality of images displayed on the scan result screen; and in response to determining that the insertion of a pair of a front-side image and a back-side image of one or more documents or the deletion of a pair of a front-side image and a back-side image of one or more documents is performed, allow the document-by-document file separation.

16. The non-transitory computer-readable storage medium according to claim 15, wherein the set of program instructions, when executed by the controller, causes the information processing apparatus to:

display an object for instructing deleting a pair of a front-side image and a back-side image on the scan result screen; and in response to an operation of the object, delete the pair of the front-side image and the back-side image displayed on the scan result screen.

17. An information processing apparatus comprising:
a communication interface;
a display;
a controller; and
a memory storing a set of instructions, the instructions, when executed by the controller, causing the information processing apparatus to:

display, on the display, a scan result screen formed by alternately arranging a front-side image and a back-side image of a document scanned by an image scanner, the front-side image and the back-side image being received from the image scanner;

perform an insertion of a single image of a newly-scanned document into a plurality of images displayed on the scan result screen, or deletion of a single image included in the plurality of images displayed on the scan result screen;

in response to determining that the insertion of a single image or the deletion of a single image is performed, disable document-by-document file separation, the document-by-document file separation separating a plurality of images displayed on the scan result screen into files, each file being a document-by-document file in which a pair of a front-side image and a back-side image of a document forms one file;

perform an insertion of a pair of a front-side image and a back-side image of one or more documents into the plurality of images displayed on the scan result screen, or deletion of a pair of a front-side image and a back-side image of one or more documents included in the plurality of images displayed on the scan result screen; and in response to determining that the insertion of a pair of a front-side image and a back-side image of one or more documents or the deletion of a pair of a front-side image and a back-side image of one or more documents is performed, allow the document-by-document file separation.

18. The information processing apparatus according to claim 17, wherein the set of program instructions, when executed by the controller, causes the information processing apparatus to:

display an object for instructing deleting a pair of a front-side image and a back-side image on the scan result screen; and in response to an operation of the object, delete the pair of the front-side image and the back-side image displayed on the scan result screen.

* * * * *